(12) United States Patent
Tyler

(10) Patent No.: US 11,154,440 B2
(45) Date of Patent: Oct. 26, 2021

(54) PATIENT LITTER BASKET WITH SPIN CONTROL

(71) Applicant: Nelson Tyler, Van Nuys, CA (US)

(72) Inventor: Nelson Tyler, Van Nuys, CA (US)

( * ) Notice: Subject to any disclaimer, the term of this patent is extended or adjusted under 35 U.S.C. 154(b) by 0 days.

(21) Appl. No.: 16/932,963

(22) Filed: Jul. 20, 2020

(65) Prior Publication Data

US 2021/0038446 A1 Feb. 11, 2021

Related U.S. Application Data

(60) Provisional application No. 62/876,545, filed on Jul. 19, 2019, provisional application No. 63/018,657, filed on May 1, 2020.

(51) Int. Cl.
| | |
|---|---|
| *A61G 3/00* | (2006.01) |
| *A61G 1/00* | (2006.01) |
| *A61G 7/08* | (2006.01) |
| *A61G 7/10* | (2006.01) |

(52) U.S. Cl.
CPC ............... *A61G 3/001* (2013.01); *A61G 1/00* (2013.01); *A61G 7/08* (2013.01); *A61G 7/10* (2013.01); *A61G 2203/30* (2013.01); *A61G 2220/10* (2013.01)

(58) Field of Classification Search
CPC . B64D 1/22; B64D 9/00; A61G 3/001; A61G 3/006; A61G 1/00; A61G 7/08; A61G 7/10; A61G 7/1001; A61G 7/1049; A61G 7/1057; A61G 2203/30; A61G 2220/10

USPC ...................................................... 244/137.2
See application file for complete search history.

(56) References Cited

U.S. PATENT DOCUMENTS

| | | | | |
|---|---|---|---|---|
| 5,626,151 | A * | 5/1997 | Linden | A61G 1/00 128/897 |
| 5,975,081 | A * | 11/1999 | Hood | A61G 1/00 128/845 |
| 10,137,047 | B1 * | 11/2018 | DiFrancesco | G08G 5/0086 |
| 2003/0213064 | A1 * | 11/2003 | Johnson | A61G 7/1057 5/86.1 |
| 2006/0174405 | A1 * | 8/2006 | Johnson | A61G 7/1032 5/81.1 R |
| 2008/0134428 | A1 * | 6/2008 | Call | A61G 7/1021 4/566.1 |
| 2008/0250564 | A1 * | 10/2008 | Stryker | A61G 7/05 5/615 |
| 2012/0036636 | A1 * | 2/2012 | Stryker | A61G 7/018 5/600 |

(Continued)

*Primary Examiner* — Peter M. Cuomo
*Assistant Examiner* — Rahib T Zaman
(74) *Attorney, Agent, or Firm* — Colin P. Abrahams

(57) ABSTRACT

A patient litter basket spin control assembly for use on a patient litter basket is provided. The assembly comprises thruster unit for discharging an air stream and is mounted on the patient litter basket. At least one sensor is associated with the thruster unit for sensing rotational movement or spin of the patient litter basket, and a power source is provided for powering the thruster unit and the sensor. A clamp member mounts on the patient litter basket and releasably receives the thruster unit. The sensors modulate the force of the air stream from the thruster unit so that the air stream counters the rotational movement of the patient litter basket to stabilize the patient litter basket by preventing the spin.

9 Claims, 14 Drawing Sheets

(56) References Cited

U.S. PATENT DOCUMENTS

2015/0135436 A1* 5/2015 Stryker ............... A61G 7/1019
　　　　　　　　　　　　　　　　　　　　5/600
2017/0327223 A1* 11/2017 Sekine ................ B64C 39/024

* cited by examiner

PATIENT LITTER BASKET WITH SPIN CONTROL

CROSS REFERENCE TO RELATED APPLICATIONS

This application claims the benefit of U.S. Provisional Patent Application No. 62/876,545 filed Jul. 19, 2019, and U.S. Provisional Patent Application No. 63/018,657 filed May 1, 2020, the contents of which are incorporated herein in their entirety.

FIELD AND BACKGROUND OF THE INVENTION

This invention relates to a patient litter basket with spin control functions. The invention in one aspect, is for a patient litter basket, preferably for use in medical airlift or rescue operations, wherein a patient or person is placed in the litter basket for removal and transportation to a hospital or other location. The litter basket has associated therewith structures and machinery which are intended to eliminate or reduce spin of the litter basket, which may be induced by ambient air movement, either from current environmental conditions, the helicopter or aircraft rotors (down wash), or a mixture of both or additional factors.

The use of helicopters and other aircraft is well known and commonly utilized for rescuing and transporting injured or ill patients who may be located in an area which is difficult to access in the normal course, due to the absence of roads or adequate pathways leading to and from such area. Even where access is available, a helicopter rescue or transport may be needed where the patient is in a critical condition and needs to be transported to a hospital in less time than it would take for regular forms of transportation, such as in ambulances.

Helicopter rescue of patients is normally accomplished by landing the helicopter nearby the person needing attention. However, there may be many instances where there is no suitable landing site or pad for the helicopter, and the patient must be reached and placed in the helicopter while the helicopter continues to remain airborne, hovering near the pickup site. In such instances, a typical manner for rescue is to lower a patient litter basket from the helicopter by means of a winch, when the helicopter is more or less directly overhead or nearby the patient. The winch may comprise a cable which is unreeled, the cable having a hook, swivel or other mechanical structure at its one end by means of which the patient litter basket is attached thereto. There may be a plurality of cables between the hook, swivel or other mechanical structure and the patient litter basket itself, in order to provide more stability to the patient litter basket.

One of the issues in such rescues relates to the possibility that the patient litter basket may begin to spin, which may be the result of ambient wind and weather conditions (such as, for example, fire driven windstorms), or the downdraft of the helicopter rotor itself. While a small amount of spin induced by such conditions may not be a problem, the induced spin may accelerate and increase so that the number of revolutions of the litter basket per minute becomes at least unpleasant for the patient, sometimes inducing sickness, and often dangerous to the patient or the rescue operation.

SUMMARY OF THE INVENTION

The present invention is therefore directed towards a device for use in association with a patient litter basket of the type described above, which is able to sense induced spin, and provide necessary counter thrust to keep the patient litter basket relatively stable, to potentially eliminate or substantially reduce any spin which may be in response to the ambient conditions.

In accordance with one aspect of the invention, there is therefore provided a patient litter basket assembly with at least one cable connector for attachment to a cable which may be raised and lowered from an aircraft such as a helicopter or drone. The litter basket itself may comprise an elongate structure having a base and sidewalls of sufficient height to protect the patient or person therein, as well as connector points or channels for the cable connectors. In one form of the invention, the patient litter basket further comprises at least one thruster unit for discharging air in the appropriate direction, opposite to the direction of spin, and which is of sufficient force to slow or stop the spin.

A single thruster unit may be provided which is able to discharge air in opposing directions, according to and in response to the direction of induced spin, or there may be two or more thruster units, each of which discharges air in one direction only. In either event, discharged air from the single or plurality of thruster units will be based on the sensed direction of spin, to counteract such spin.

In another embodiment of the invention, there may be associated with the patient litter basket a wind deflector which is located in the downwash or path of the air stream produced by the rotor of the helicopter, wherein the wind deflector is selectively movable between incremental positions in which it may deflect more of the downwash or air stream of less of the downwash or air stream, so that sufficient deflection is optimally achieved at any one point to counter the spin of the patient litter basket, and thereby keep the patient litter basket reasonably stable.

The patient litter basket assembly also preferably comprises a gyroscope, for sensing movement and spin, and for activating the thruster units or suitably positioning the wind deflector as appropriate to counteract the induced spin of the litter basket. Preferably, the gyroscope comprises a no spin yaw gyroscope. Note that other types of sensors for detecting spin may also be used, and the invention is not limited to one which uses gyroscopes.

The thruster units and/or wind deflector assembly may be located at one or more convenient positions on the patient litter basket itself, or on the cable connectors from which the patient litter basket is suspended and attached. Where a wind deflector assembly is utilized, it will be placed in a position so that it can take advantage of and benefit from the downwash or downdraft from the overhead helicopter.

DETAILED DESCRIPTION OF THE INVENTION

Reference is now made to the accompanying drawings, which show different aspects of a patient litter basket assembly in accordance with the invention.

Figure 1:
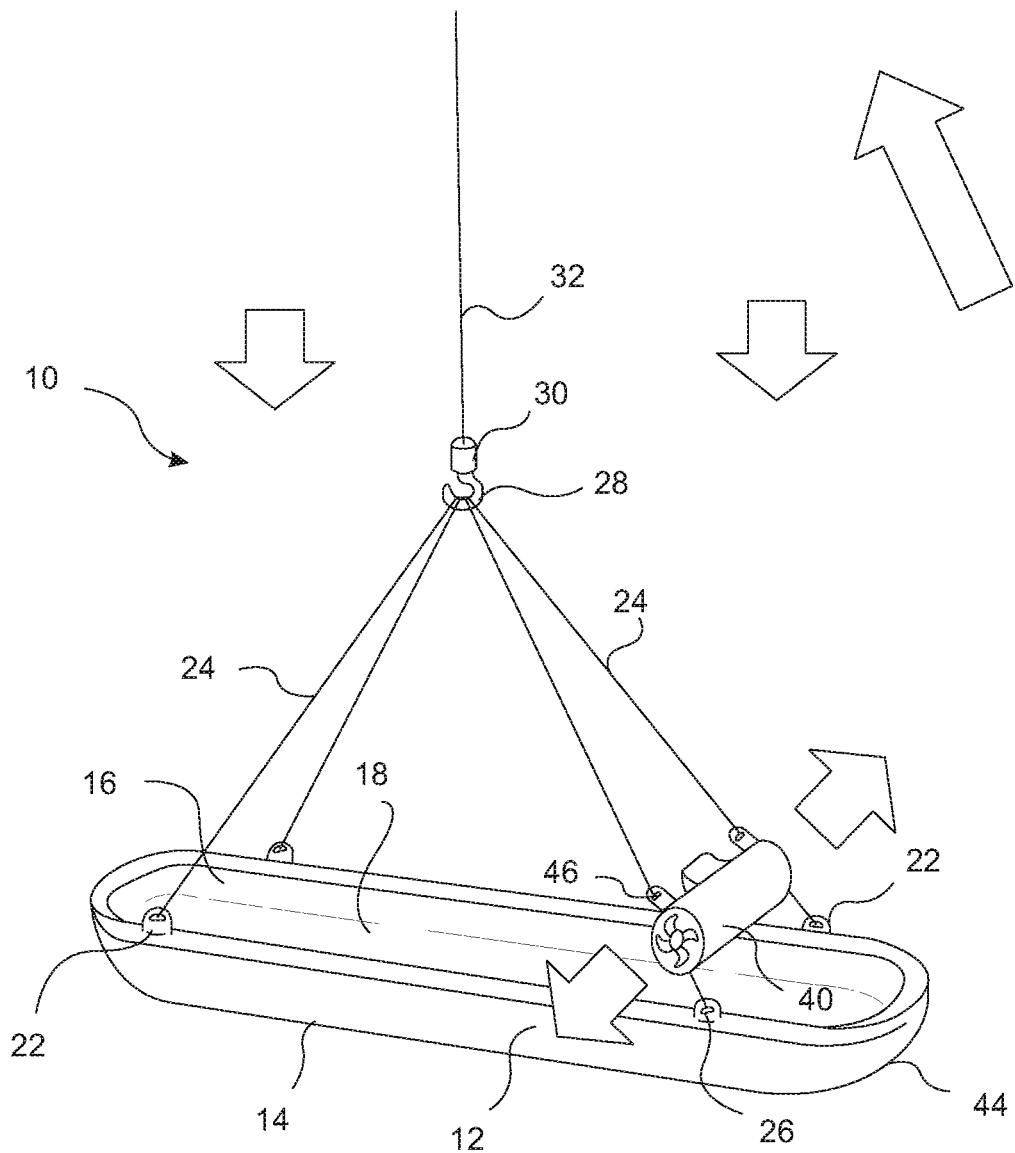
FIG. 1 is a perspective view of a patient litter basket assembly in accordance with one aspect of the present invention.

FIG. 1 of the drawings shows a patient litter basket assembly 10 in accordance with the invention. The assembly 10 includes a patient litter basket 12, of elongate size and a somewhat narrower width, with a base 14 and sidewalls 16 defining a patient space 18. The patient or person space 18 is of sufficient size to allow such person to be placed in the patient litter basket 12 in a supine position, and there may be appropriate contours, securing straps, mattresses or padding, and other structures to properly secure the person within the patient litter basket 12 in a secure and comfortable position.

The patient litter basket 12 has a pair of connecting tabs 22 on each of the longitudinal side edges thereof. Other forms of connection besides connecting tabs may be provided on the patient litter basket 12 illustrated in accordance with this embodiment of the invention. A connector cable 24 is secured in an aperture 26 of each of the connecting tabs 22, and extends to a hook 28 with swivel device 30. The hook 28 with swivel device 30 is attached to a winch line 32 at one end thereof. At the other end, the winch line 32 is attached to a winch drum or spool (not shown) which, in conventional fashion, can be rotated either by hand manually or, more conventionally in larger applications, by a winch motor where the loads are heavier. The winch spool is therefore able to raise and lower the winch line 32 and the attached swivel 30 with hook 32 at the other end.

In FIG. 1 of the drawings, a no spin thruster unit 40 is attached to a pair of the cables 24, in a position just above the top edges of the patient litter basket 12. Preferably, this attachment portion is at the foot end 44 of the patient litter basket 12, so that the head of the patient or person being airlifted will be further from this thruster unit 40 in order that it should cause less discomfort, such as through vibration or noise, to such person. The thruster unit 40 is also preferably positioned so as to interfere as little as possible with the placement and removal of the person within the patient litter basket 12. The thruster unit 40 is generally of tubular shape, and has latches or tabs 46 by means of which it can attached to the connector cables 24. There are several different mechanisms and configurations by means of which the thruster unit 40 can be attached to the cables 24, and all of these constitute a part of the present invention. For example, the continuous connector cables may be threaded through the tabs 46 or latches of the thruster unit 40. In another embodiment, the connector cables may not be continuous but each connects to the thruster unit 40 at a tab 46 or connection point thereon.

Associated with the thruster unit 40 is a sensor 50 (in FIG. 6 for example), which may preferably be in the form of a gyroscope, and which is capable of sensing the position and/or movement and/or orientation of the patient litter basket 12. As previously mentioned, the patient litter basket 12 may start to spin, wherein the spin is induced by the downwash of the helicopter rotor blades, ambient wind or atmospheric conditions, or a combination of these and potentially other factors. These are the more common conditions which cause spin, but, for the purposes of this invention, it does not matter at all what causes the spin, and it is the purpose of the invention to counteract such spin whatever its origin or the cause of it might be.

The thruster unit 40 in accordance with this aspect of the invention comprises propellers or rotor blades 54 contained within the generally tubular or cylindrical housing 56 or container. There may be a single rotor blade 54 within the housing, or multiple blades. When the rotator blades 54 are activated, a thrust is provided, forcing outwardly from one of the open ends 58 or 60 of the thruster unit 40.

If a single, or even several, rotator blades 54 are contained within the housing 56 of the thruster unit 40, the direction of the air discharge may be achieved by spinning the rotator blades 54 either clockwise or counterclockwise to achieve the discharge of air or thrust in the desired direction. In another embodiment, rotator blades 54 may be provided, with one or more rotator blades for moving to provide thrust in one direction, while one or more other rotator blades are moved to provide thrust in the other opposing direction. These are two examples, and other configurations and possibilities for within the scope of the invention.

The rotator blades 54 within the thruster unit 40 are activated when the sensor 50 detects that the patient litter basket 12 is starting to rotate about its vertical axis due to, for example, induced spin from the helicopter downwash or other atmospheric conditions. The direction and angular speed of spin is detected, and a selected rotator blade or blades 54 within the thruster unit 40 is activated so as to provide a counter force to the direction of spin. Clearly, where the spin is slower, less thrust will be required from the thruster unit 40. Conversely, where the induced spin is the result of powerful outside forces, the thruster unit 40 will provide more thrust, as necessary. The sensors 50 associated with the thruster unit 40 continuously measure the spin or angular rotation of the patient litter basket 12, so that the thrust, as well as the direction of thrust, may be continuously modulated according to the external forces and the extent of spin the patient litter basket 12 may be undergoing at any one time.

Figure 5:
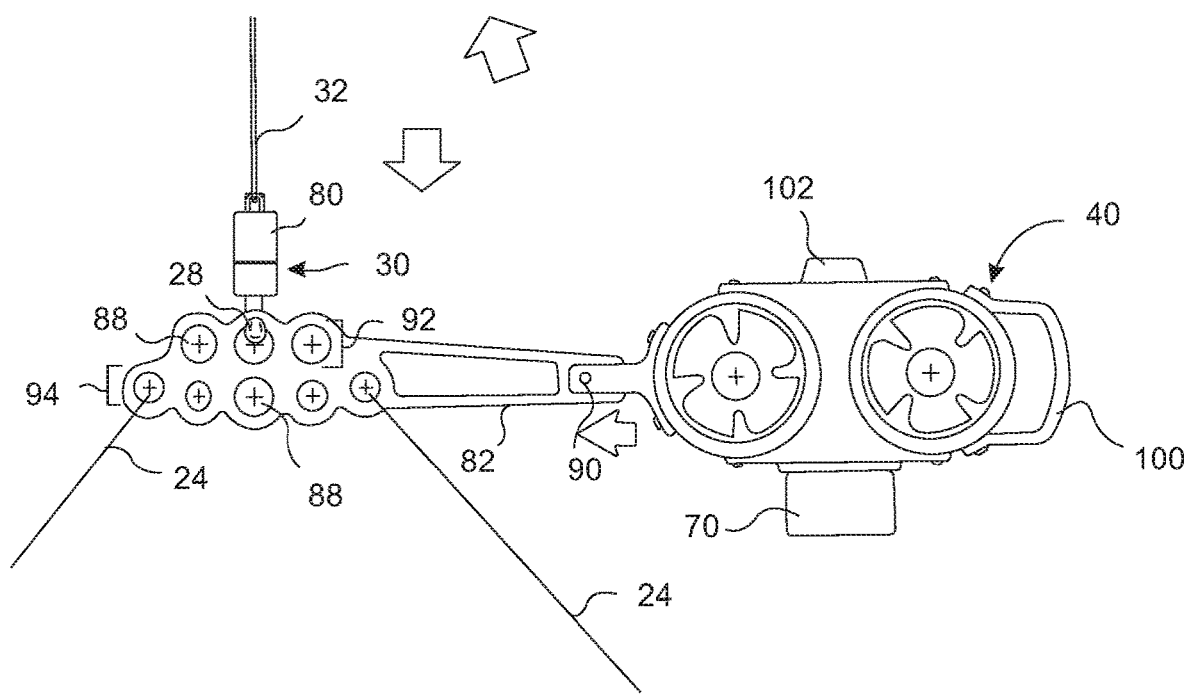
FIG. 5 is a detailed view of the thruster unit and bracket of the patient litter basket assembly as shown in FIG. 4 of the drawings.

The thruster unit 40 itself is preferably electrically operated such as by batteries 70, such as shown in FIG. 5, preferably rechargeable batteries, or it may have electric input cables from the helicopter or drone. Other forms of power may also be used, including a gas powered engine which is also receptive to ambient spin conditions from information received from onboard sensors 50, such as a gyroscope. Note that there may be as many sensors 50, in desired and selected locations on the patient litter basket 12 or the connector cables 24, as may be necessary to accurately sense and control and counteract the spin of the patient litter basket 12 caused by the ambient conditions.

Figure 2:
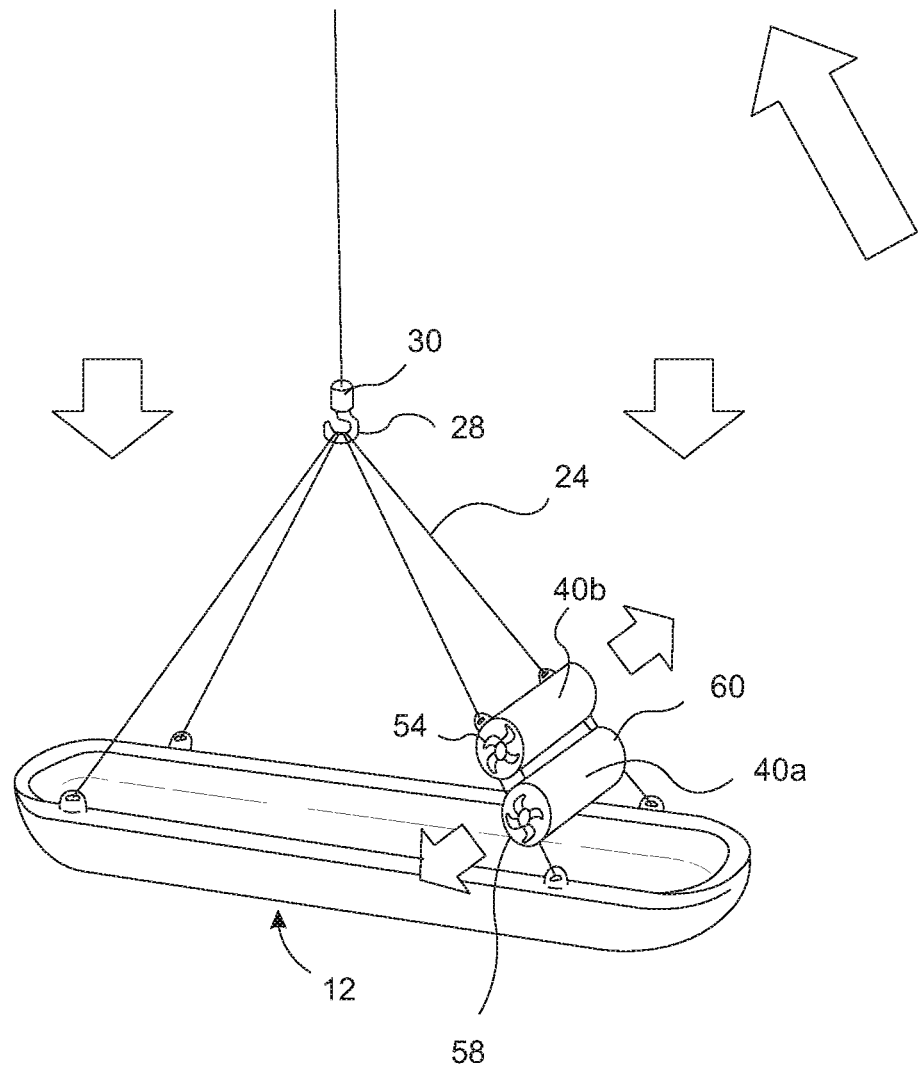
FIG. 2 is a perspective view of a patient litter basket assembly in accordance with a further aspect of the present invention.

Reference is now made to FIG. 2 of the drawings. FIG. 2 of the drawings shows a patient litter basket assembly 12 in many ways similar to that shown in FIG. 1 of the drawings. In FIG. 2, however, it will be seen that two thruster units 40*a* 40*b* are provided, both located on the connector cables 24 between the patient litter basket 12 and the swivel 30 and hook 28 structure. Each of the thruster units 40*a* and 40*b* is connected to the sensing apparatus 50 of the assembly 12. In this embodiment, the first of the thruster units 40*a* discharges in one direction, while the second of the thruster units 40*b* discharges in an opposing direction. According to the spin of the patient litter basket 12, one of the thruster units 40*a* or 40*b* will be activated to counteract any spin to which the patient litter basket 12 is being subjected. One potential advantage of having the two thruster units, each providing thrust in opposite directions, is that both can be continually running at a very low level during the rescue operation, and immediately accelerated or sped up as the situation requires. This may provide a shorter reaction time and thus be more effective than having a single thruster unit 40 which, for example, may need to stop the rotating of the blades in one direction and commence rotating such blades 54 in the opposite direction to reverse thrust, if required by external forces.

Figure 3:
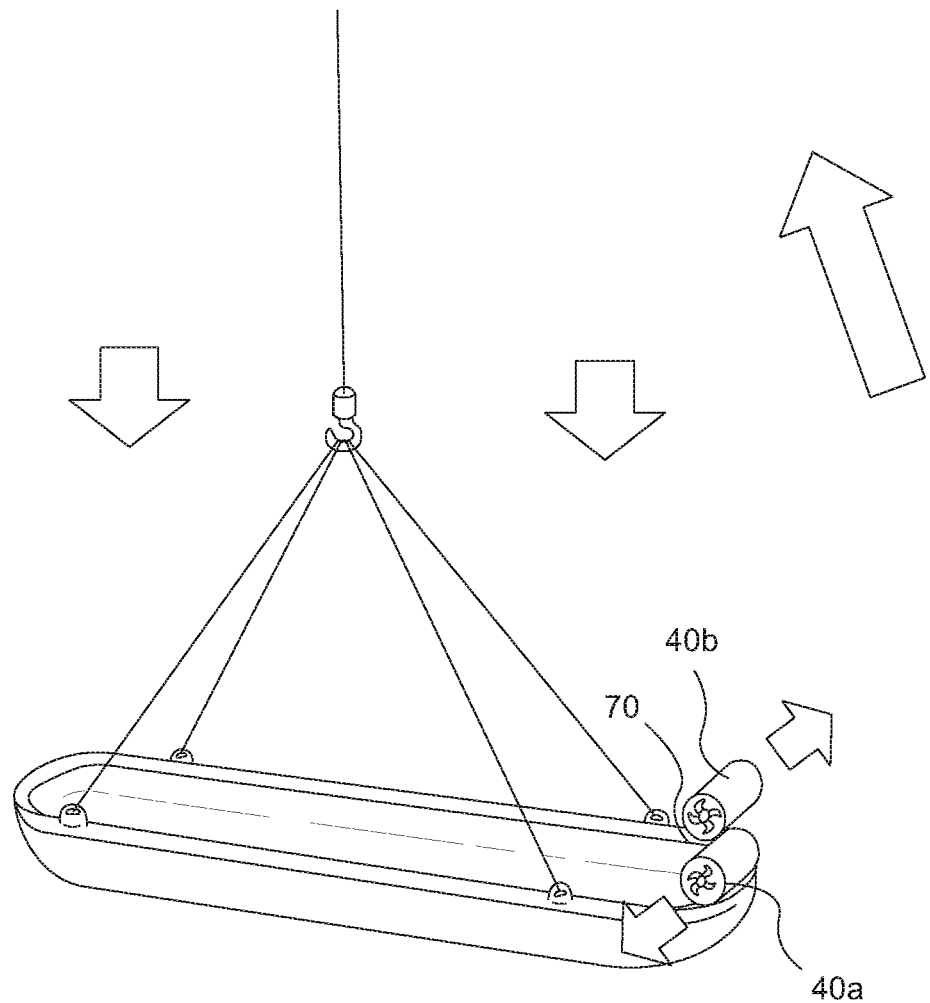
FIG. 3 is a perspective view of a patient litter basket assembly in accordance with yet a further aspect of the present invention.

FIG. 3 of the drawings shows a patient litter basket assembly 12 in accordance with a further aspect of the invention. In this embodiment, a pair of thruster units 40*a* and 40*b* are provided, not on the connector cables as shown in the previous embodiments, but rather mounted on a frame or structure or bracket 70 at one end of the patient litter basket 12.

In fact, the thruster units 40 may be located in many different positions relative to the patient litter basket 12, either directly on the patient litter basket 12, or on the cables 24 from which it is suspended. A single thruster unit 40 may be provided, or a multiple or plurality of such thruster units 40 may be provided and may be located at different points or positions on or relative to the patient litter basket 12. In any situation, a configuration which best meets the type of situation which is likely to be encountered in actual rescue and recovery operations is selected, and it is to be noted that the thruster units 40 may be removable on or with respect to the patient litter basket 12 so that they can be charged, serviced and maintained when not in use. The patient litter basket and the connector cables may be configured so that a preferred location or locations can be selected for the thruster units in any particular operation, depending upon ambient conditions, the nature of the operation, and such other factors.

Figure 4:
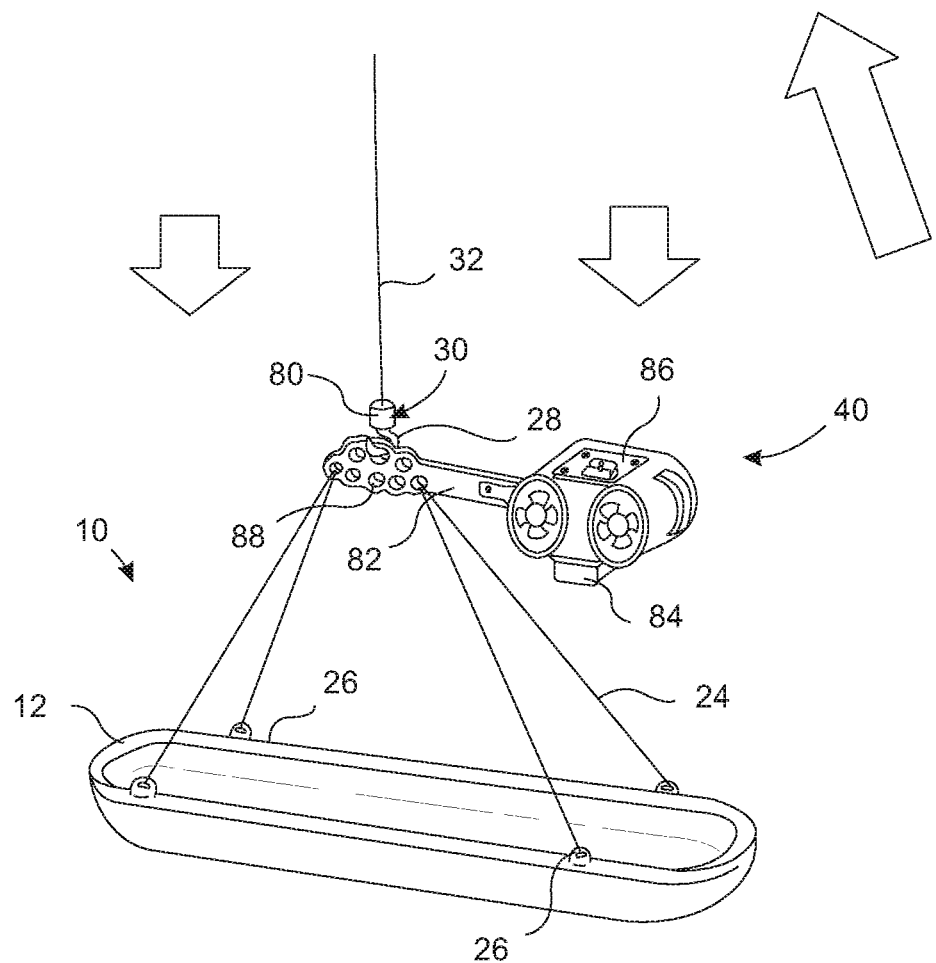
FIG. 4 is a perspective view of a patient litter basket assembly in accordance with a further aspect of the present invention.

FIG. 4 of the drawings shows a further embodiment of a patient litter basket assembly 10 in accordance with the present invention. In this figure, there is shown the patient litter basket 12, suspended from a cable 24 and swivel 30, or winch line 32, controlled from a helicopter. In this embodiment, the swivel 30 includes a connector portion 80 for fastening to the winch line 32, and a hook 28 for fastening to the bracket arm 82 of a thruster unit 40. The thruster unit 40 includes batteries 84 and a one axis yaw gyro 86, which may be similar to those of the type described above. The thruster unit 40 is supported by the bracket arm 82, the end of which has a number of apertures or holes 88 for receiving the hook 28 on the swivel assembly 30. As will be seen, there are a plurality of such holes or apertures 88, and the most suitable one may be chosen in the circumstances so as to orient and locate the thruster unit 40 relative to the patient litter basket 12.

FIG. 5 of the drawings shows a detail of the bracket arm 82 in one embodiment. Details of the construction of the hoist cable 32, connected to the hoist swivel 80, in turn connected to the hoist hook 28 can be clearly seen, with the hoist hook 28 being received in one of the apertures 88 of the bracket or arm 82. The bracket or arm 82 is connected to the unit 40 by means of a release pin 90, so that the thruster unit 40 can be readily installed and removed, without necessarily affecting connection of the hoist cable 32 to the patient litter basket 12.

The arm or bracket 82 has a top set of holes or apertures 92, three in number as shown in FIG. 5, and a bottom set of holes or apertures 94, five in number as shown in FIG. 5. The top holes 92 may be used for connecting the assembly to the hoist hook 28, while a selected hole or aperture from the bottom set of holes 94 are used for connection of the litter basket cables 24, which extend from the bracket or arm 82 to appropriate connectors or tabs 26 on the patient litter basket 12 itself.

FIG. 5 of the drawings also shows the detail of the thruster unit 40, or no spin unit, including the positioning of the battery 70 outside of the unit 40, so that batteries 70 can be readily removed and replaced as needed, when depleted of energy. There is further shown a handle 100 for holding the thruster unit 40, as well as a switch guard 102 for protecting the operational controls and possibly sensitive sensors of the thruster unit 40.

Figure 6A:
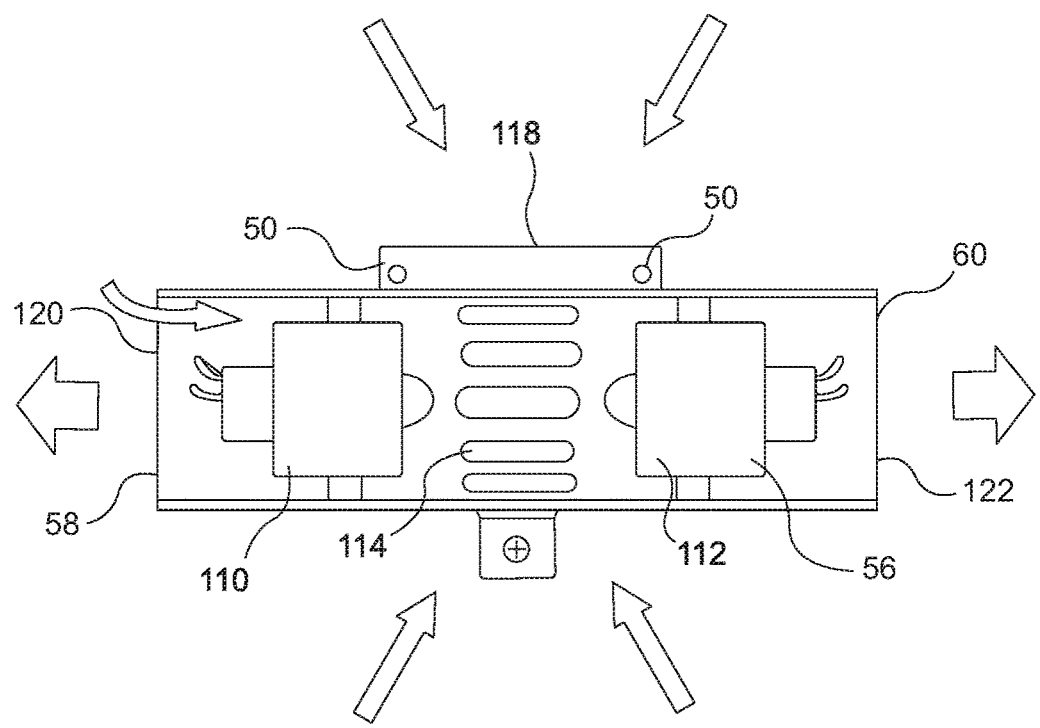
FIGS. 6A and 6B are side section and end view schematic representations of the thrusters and airflow of a patient litter basket assembly in accordance with the invention.
Figure 6B:
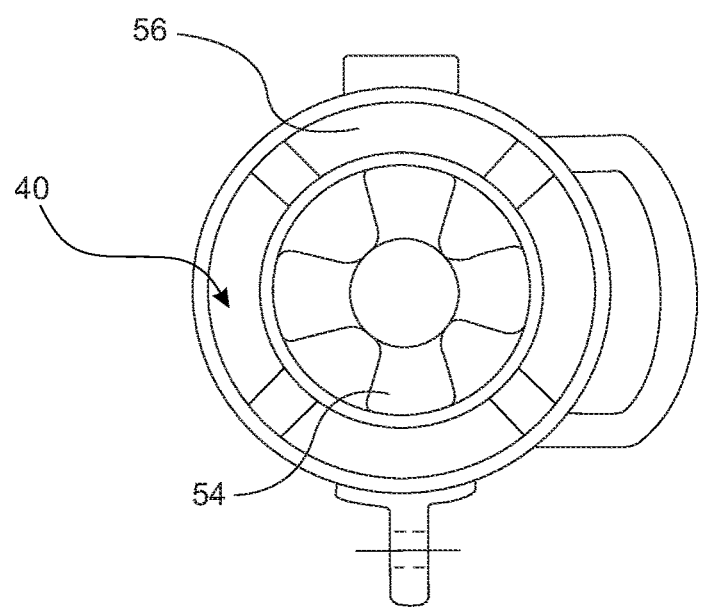

FIGS. 6A and 6B of the drawings are section side view and end view schematic representation of a further embodiment of a patient litter basket assembly 10. The assembly 10 comprises a housing 56, as well as a jet fan A 110 and a jet fan B 112 contained within the housing 56. These jet fans 110 and 112 are back-to-back with respect to each other. The housing 56 comprises a plurality of air inlets 114 around the circumference or outer surface thereof at about the middle of the housing 56 through which air is drawn when either one of the jet fans A 110 or B 112 contained within the housing 56 is operational. The housing 56 further comprises a box 118 or compartment for containing the electronics of the device, as well as a mounting tab.

When jet fan A 110 is not running, and jet fan B 112 is running, air is able to bypass through and around jet fan A 110 to feed jet fan B 112. In this embodiment, the construction of the housing 56 therefore facilitates the feed of air to whichever of the jet fans 110 or 112 is operational. This feed is drawn in from the central air inlets 114, as well as the air outlet 120 or 122 from the other jet fan not currently in operation. It will be appreciated that, in this embodiment, only one of the jet fans 110 or 112 will be running at any one time. Air will be discharged from the housing 56 by the operating jet fan 110 or 112 through the respective end outlet 120 or 122, as illustrated in this figure.

Figure 7:
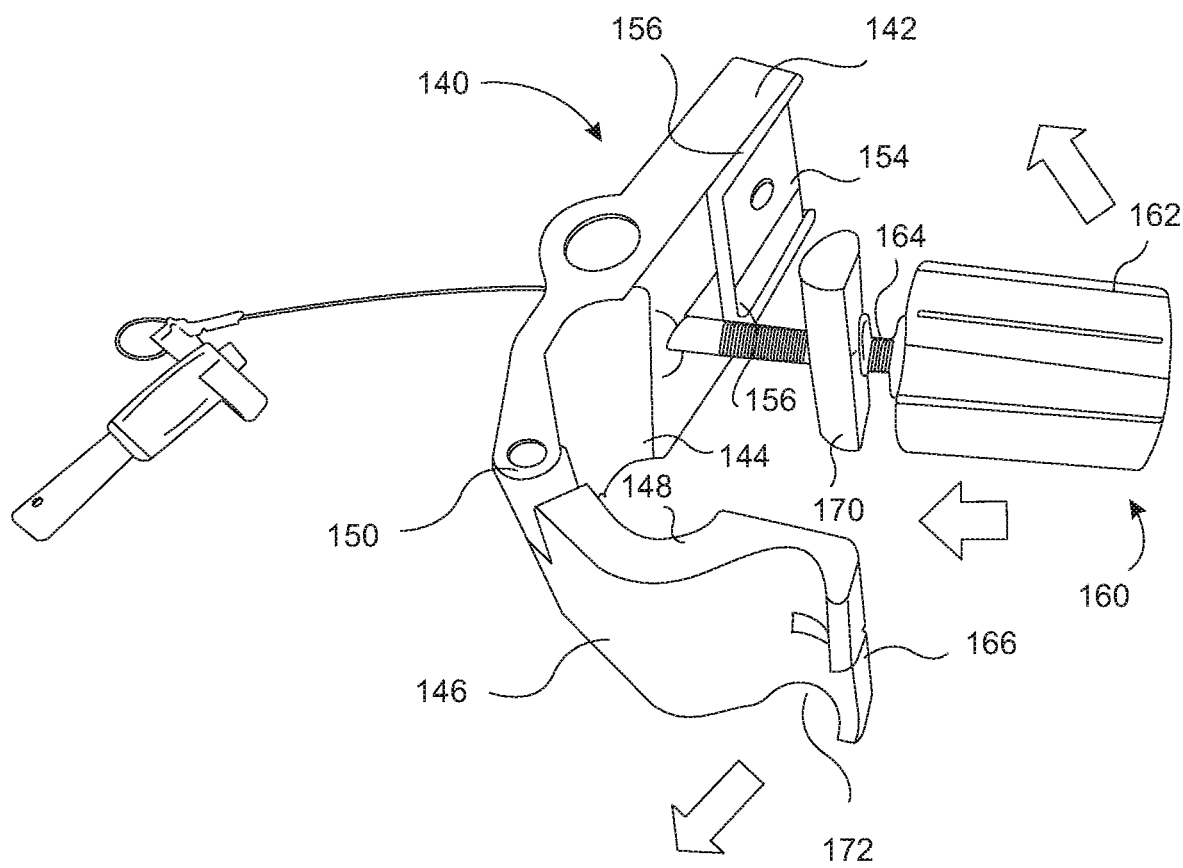
FIG. 7 is a perspective view of a clamp mechanism for connecting the thruster unit to a litter basket.
Figure 8A:
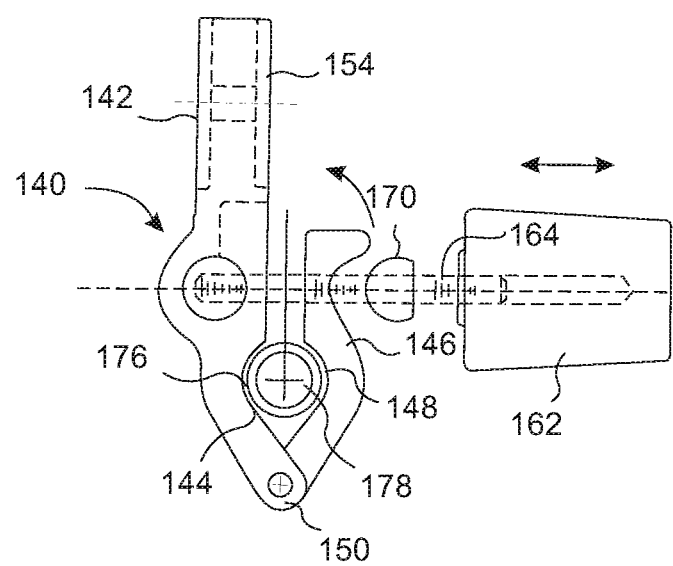
FIGS. 8A and 8B illustrate schematically a side view and front view respectively of a litter basket clamp which may be used in accordance with the present invention.
Figure 8B:
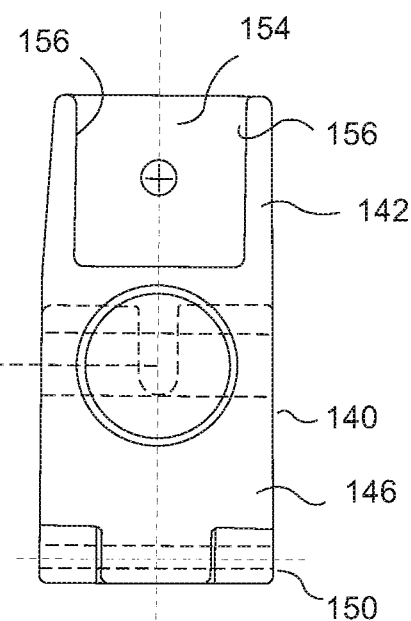

FIGS. 7, 8A and 8B of the drawings illustrates a clamp 140 by means of which the thruster unit 40, or no spin unit, may be attached to a patient litter basket 12. The patient litter basket 12 is typically comprised of a frame, which may include cylindrically shaped tubes or other components to which the clamp 140 may be attached. In this figure, the clamp 140 comprises a first fixed component 142 including a semicircular shaped recess 144, and a second movable component 146 having a correspondingly positioned semicircular shaped recess 148, the second component 146 being pivotally connected to the first component 142 about a common axis 150 so that it is movable between a first open position, as shown in FIG. 7, and a second closed position (as seen in FIGS. 8A and 8B).

The fixed component 142 has at its end opposite to that of the semicircular recess a receiving section 154 with guide rails 156 on either side or laterally thereof. The clamp 140 further comprises a closure mechanism 160 including a knob 162 which is mounted on a threaded shaft 164. The movable component 146 includes a slot 166 at its one and, which, when the clamp 140 is in the closed position, receives the threaded shaft 164. In this position, when the knob 162 is tightened, a securing member 170 is moved to abut against a correspondingly shaped receiving space 172, and when the knob 162 is sufficiently tightened, the fixed component 142 and the movable component 146 will be secured in the closed position relative to each other.

The semicircular recess 144 and 148 present on both of the fixed component 142 and the movable component 146 of the clamp 140 are adjacent each other when so tightened and define a channel 176 which receives part of the tubular or cylindrical frame 178 of the patient litter basket 12. In this way, the clamp 140 can be very securely fastened to the patient litter basket 12. The receiving section 154 will be facing upwards, and this receiving section 154, together with its lateral guide rails 156, is able to accommodate, receive and securely hold a thruster unit 40 in accordance with the invention. The thruster unit 40 can be easily inserted or removed from the clamp 140. While the clamp 140 can be disconnected from the patient litter basket 12, it may also be secured thereto more permanently or for the longer-term, so that it will always be available for receiving and holding the thruster unit 40 when ambient conditions make it a necessity to stabilize the patient litter basket 12 using the thruster unit 40 to discharge air so as to counter spin or resist rotational movement induced by ambient wind, or the downward wash produced by the spinning rotors of the helicopter.

FIGS. 8A and 8B show a side view and a front view respectively of the clamp 140 illustrated in FIG. 7, with the clamp 140 in the closed or locked position. The tubular portion 178 of the frame on the patient litter basket 12 can be seen sandwiched between the fixed component 142 and the movable component 146 of the clamp 140. FIG. 8A shows the side view of this arrangement, with the components somewhat spaced from each other to show their shape and configuration and how they cooperate and fit together, as well as in front view in FIG. 8B. The front view of the clamp 140 in this figure clearly shows the receiving space 154 with the lateral guide rails 156, by means of which the thruster unit 40 is easily and effectively mounted on the clamp 140.

Figure 9:
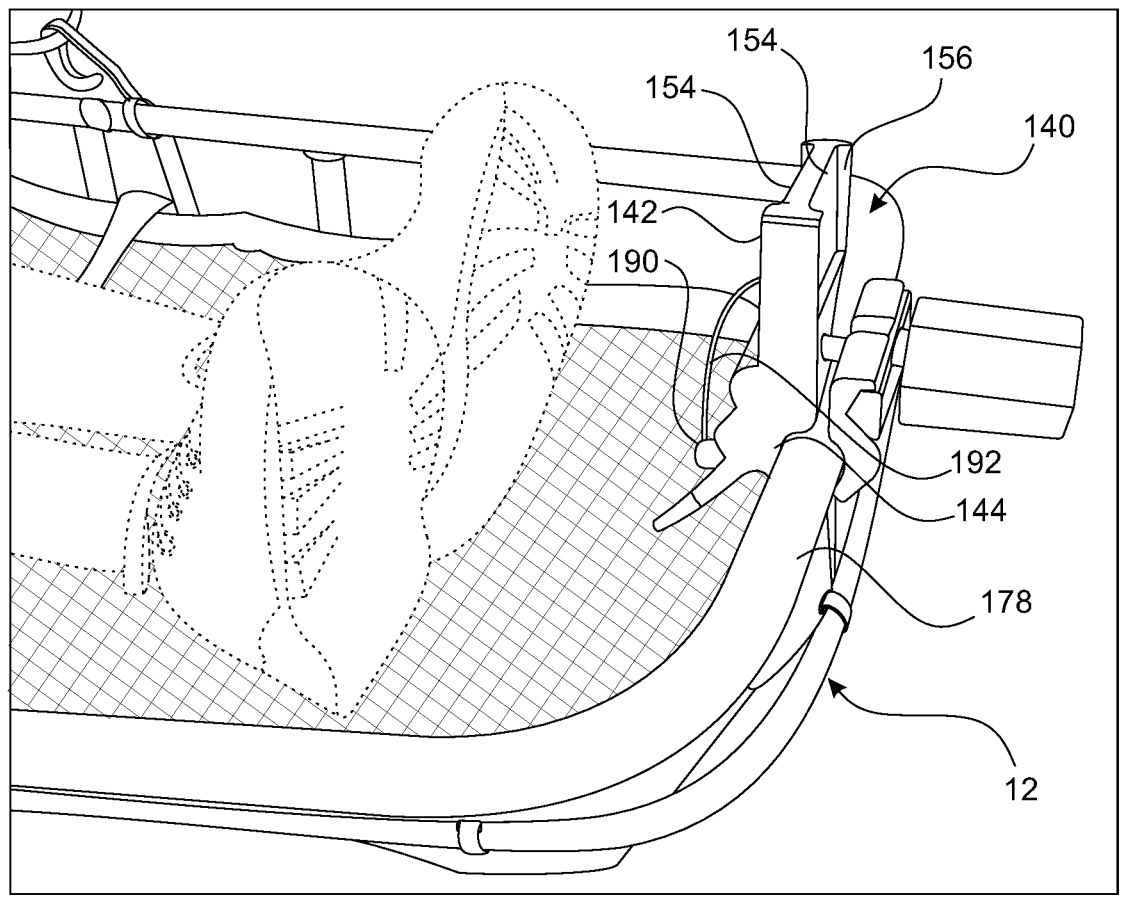
FIG. 9 is a perspective view of a clamp mounted on a litter basket in accordance with the invention.
Figure 10:
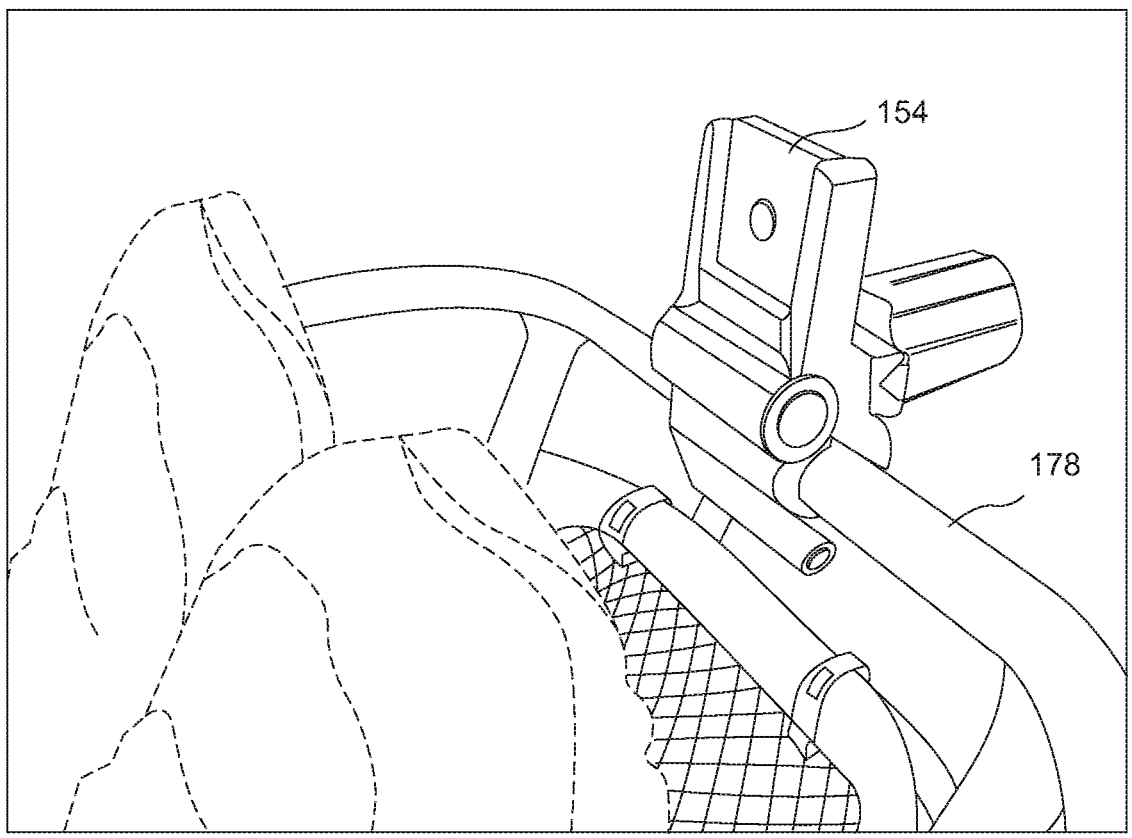
FIG. 10 is a further perspective view of a clamp mounted on a litter basket, viewed from the front, in accordance with the invention.

FIG. 9 of the drawings shows a portion of the patient litter basket 12 having an upper tubular frame member 178, and the clamp 140 securely mounted on the upper tubular frame member 178. A receiving space 154 on the fixed portion 142 of the clamp 140 can be seen on either side thereof, with guide rails 156, providing an easy snap on or slide on motion for the thruster unit 40. A safety pin 190 with steel cable 192 is provided as a backup connection between these components. FIG. 10 of the drawings shows a similar view to that in FIG. 9, but with the front of the clamp 140 and its receiving space 154 clearly visible.

Figure 11:
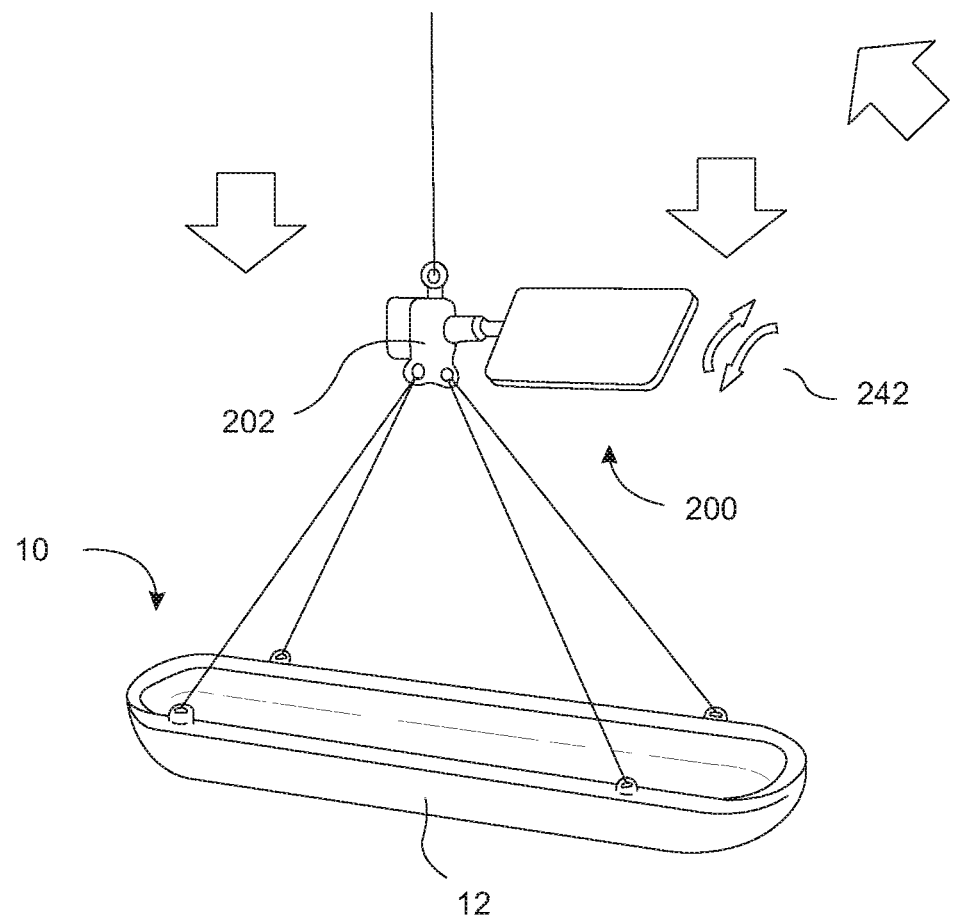
FIG. 11 is a perspective view of a patient litter basket assembly in accordance with a further embodiment of the present invention.

FIG. 11 of the drawings illustrates a further embodiment of a patient litter basket assembly 10 in accordance with the invention. (Corresponding reference numerals to the previous figures will be used wherever appropriate.) This description also applies with respect to FIG. 12 the drawings, and both of these figures show a deflector assembly 200 for reducing or countering spin caused by a helicopter or other ambient conditions.

Figure 12:
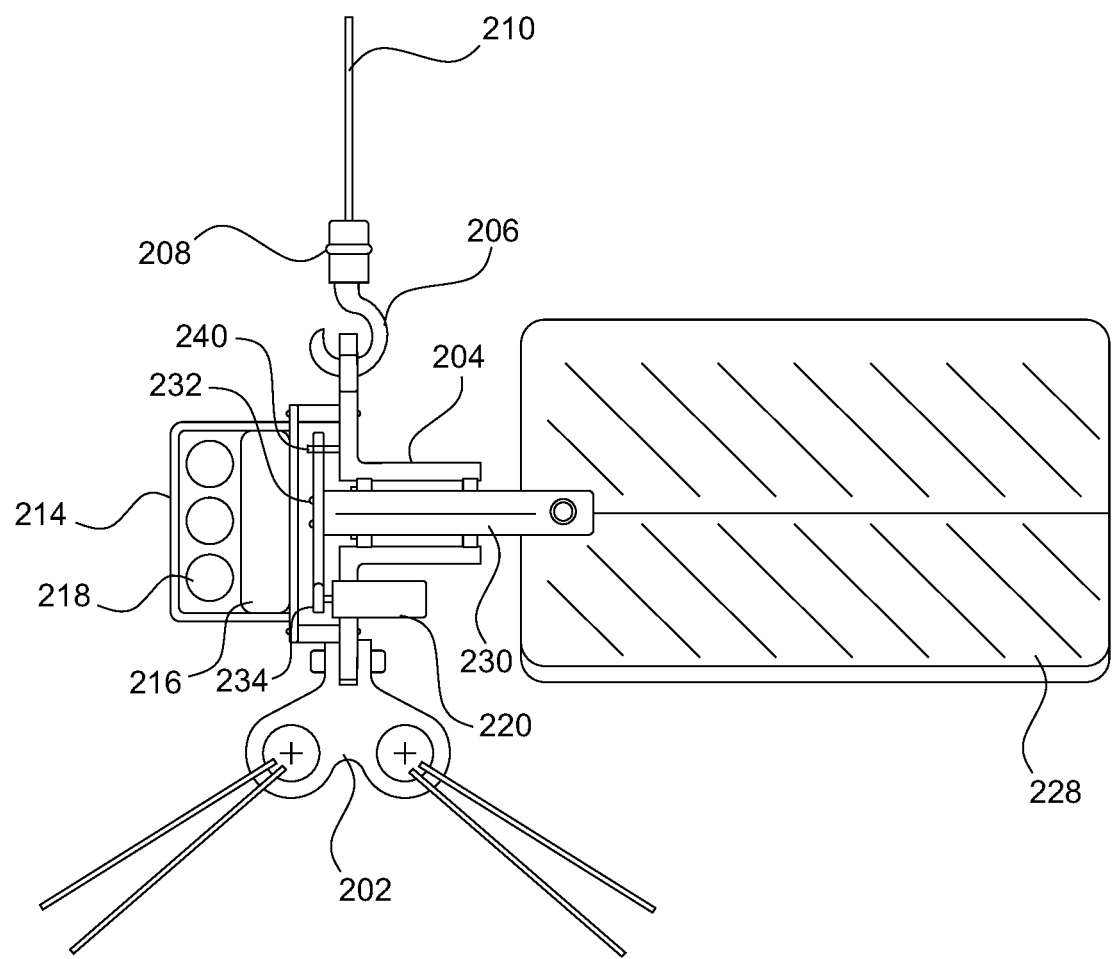
FIG. 12 is a schematic representation shown in further detail of the thruster unit and wing mechanism of the patient litter basket as shown in FIG. 11 of the drawings.
Figure 13:
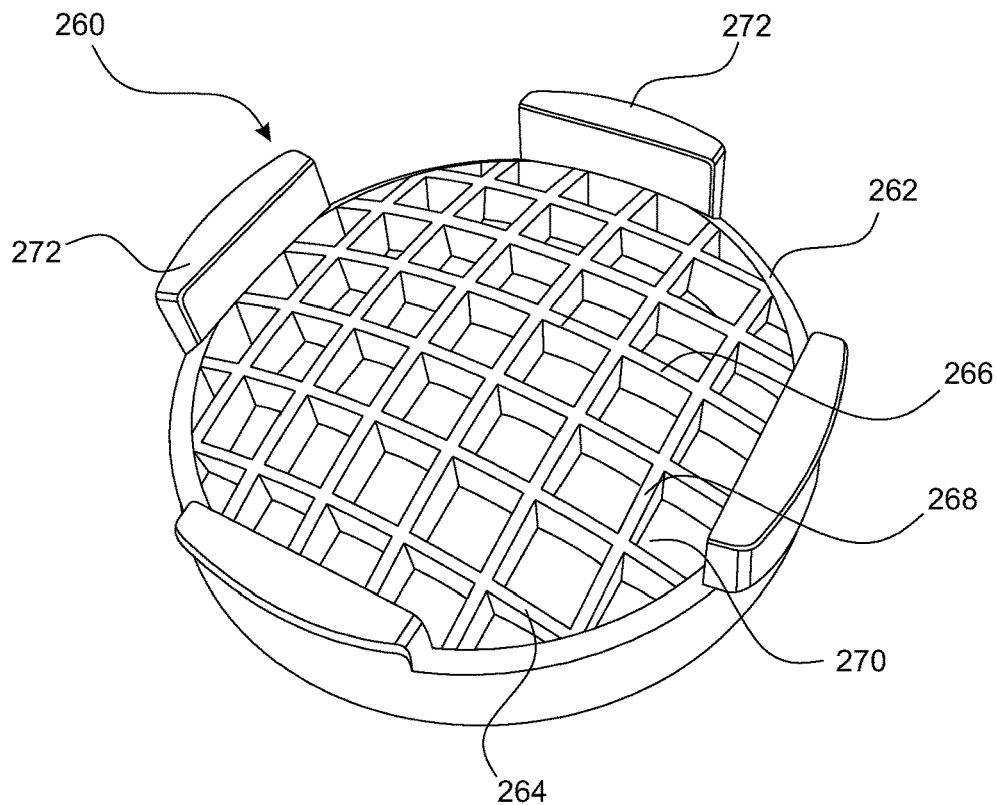
FIG. 13 is front perspective view of a protector grate and thrust focus assembly for use with a thruster unit of the invention.

These FIGS. 11 and 12 illustrate the patient litter basket 12, connected to a basket lift ring 202 which is itself connected to or a part of the deflector assembly 200, or no spin unit, in accordance with the invention. The system includes the mainframe 204, connected to the basket lift ring 202 at its lower end, and is connectable to a hoist hook 206 at its upper end. The hoist hook 206 is itself connected to a swivel joint 208, which fastens to the hoist cable 210. The patient litter basket 12 can be lowered or raised using a winch to lay out or haul in the hoist cable 210.

The housing 214 comprising the deflector assembly 200 is attached to the main frame 204. The housing unit 214 accommodates the gyro and other electronics 216, the batteries 218, and a motor 220 is provided which is powered by these batteries 218. The system further comprises a wing 228, fin or flat platelike member, connected to a pivot shaft 230, the pivot shaft 230 being connected at its opposite end to a pivot gear 232. The motor 220 includes a drive gear 234, and appropriate activation of the motor 220 and rotation of the drive gear 234 in turn rotates the pivot gear 232. The rotation of the pivot gear 232 will rotate the pivot shaft 230 about its axis in the direction of rotation of the pivot gear 232, which in turn rotates the no spin wing 228. A pivot gear stop 240 is provided to limit the extent of rotation of the pivot shaft 230 and attached fin or wing 228.

If the patient litter basket 12 starts to spin, the onboard gyro and associated electronics 216 turns on the motor 220, and the drive gear 234 thereof, through the pivot gear 232 and pivot shaft 230, rotates the fin or wing 228, preferably through an angle of up to about 180, or about 90 in each radial direction. FIG. 11 of the drawings illustrates with the appropriate arrows adjacent to the fin or wing 228 a pivot line 242, about which the rotation in opposing directions can be effected. In other embodiments, the wing or fin 228 may be able to move through different angular distances, as may be needed.

When the wing 228 is generally vertical in position, it will usually be least affected by the downwash of the helicopter. As it is rotated toward the horizontal orientation, it will be increasingly affected by the downwash, and acquire more and more as it moves to the horizontal the ability to provide a rotational or counter-rotational force to the spin from the helicopter downwash or ambient wind conditions on the patient litter basket 12.

The helicopter down wash, impacting the fin or wing 228, will thus be able stop the spin according to its angular position, and the onboard electronics 216 is able to selectively adjust the position of the fin or the wing 228 so that it will be properly oriented and positioned to provide a counter-force to any spin of the patient litter basket 12 from the helicopter or ambient conditions. Furthermore, the wing 228 can be incrementally re-oriented as may be necessary, on a real-time basis, so that its position is always optimal or near optimal to set up the necessary counter-force for preventing the spin of the patient letter basket 12, and keeping it substantially stable and safe. In this embodiment of the invention, the downward drafts or wash from the helicopter rotors are thus utilized and appropriately harnessed and deflected in order to reduce or minimize or eliminate the spinning of the patient litter basket 12.

The wing member may have a generally flat surface, or it may have curvature to facilitate air flow over the surface and improve efficiency.

Figure 14A:
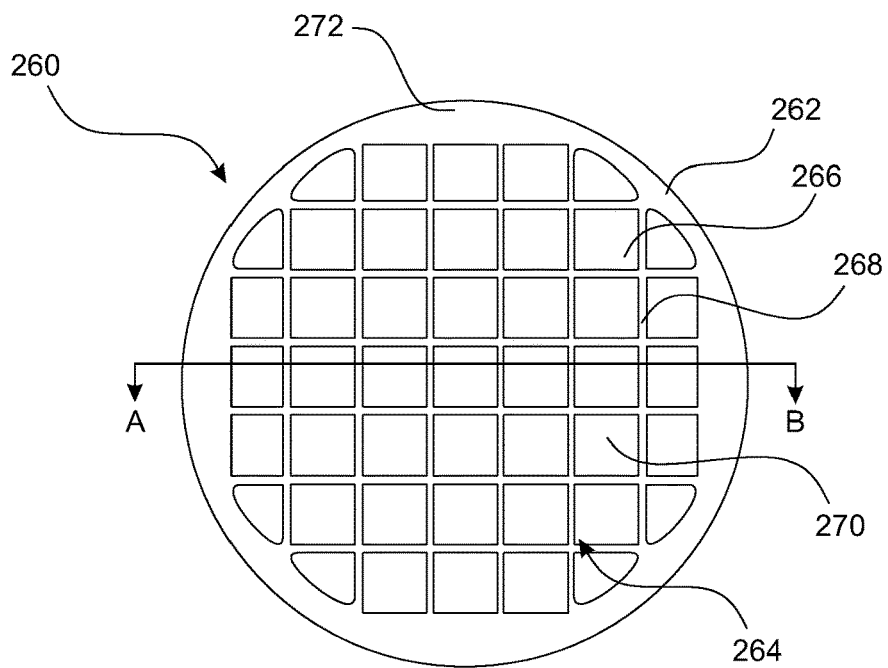
FIGS. 14A, 14B and 14C are front, top and side views respectively of the protector grate and thrust focus assembly for use with a thruster unit as shown in FIG. 13 of the drawings.
Figure 14B:
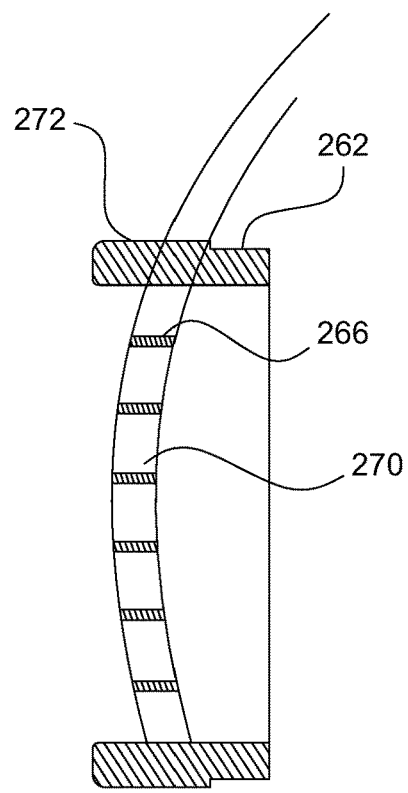
Figure 14C:
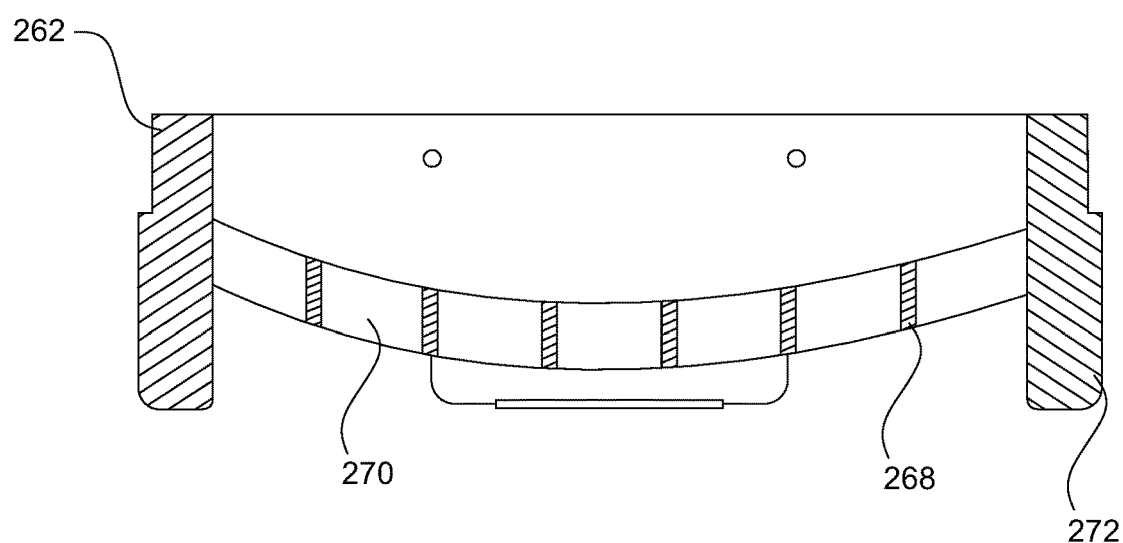

FIGS. 13, 14A, 14B and 14C show various views of a screen or grate 260 which is able to fit over the thruster unit 40 of the invention. FIG. 14A is a front view, FIG. 14B is a section view through line B-B, and FIG. 14C is a section view through line A-A. This screen or grate 260 may have several benefits. In one aspect, it may function as a protector barrier between the outside of the thruster unit and the fans within. It is of course feasible that the fans will rotate at a substantial speed when conditions so warrant, and thereby constitute a danger to those working around or near the thruster unit, or the operators of the unit itself. The screen or grate 260 is therefore a safety device in one context. Furthermore, the screen or grate 260 may also comprise deflection characteristics so that the discharge of air from the thruster unit can be better focused or directed, and therefore operate more efficiently.

The screen or grate 260 comprises an outer peripheral ring 262 of generally circular shape, but it may be of any suitable shape configured so that it will fit on the end of a thruster unit 40. A grid of internal walls 264 are constructed inside the ring 262. The grid of internal walls 264 has in the embodiment illustrated a series of first parallel walls 266 and a set of second parallel walls 268 at approximately right angles to the first parallel walls 266. Together, these form a plurality of square spaces 270 through which the air from the thruster unit 40 is expelled from the assembly. The spaces 270 are small enough to prevent fingers or most other objects from touching the fans.

Furthermore, the first and second parallel walls 266 and 268 have a height or depth in the direction of the airflow. This allows the airflow to be more accurately directed or focused, so that a better and more efficient discharge of air can be achieved. This structure has a number of consequential advantages. One such advantage is that less battery power may be needed since the air flow is more focused, and the amount of air expelled from the thruster unit 40 may be less than would otherwise be required. Therefore, fewer batteries may be needed in the device, or the same number of batteries would last longer. If fewer batteries are needed, the device can be lighter, smaller and more easy to maneuver, making for a more efficient and more utilitarian assembly. This is important as size and weight can sometimes be significant factors in those situations where these types of units of the assembly may be required.

The screen or grate 260 may be connected to the thruster unit by any suitable means, such as screws, threaded connectors, snap on connectors and the like. The ring 262 may also include four handles 272 more or less equi-spaced along the edge thereof to facilitate handling installation of the grate 260. In addition, the first and second parallel walls 266 and 268 may have a different configuration to that illustrated. The spaces 270 may be smaller or larger, and the height or depth of the walls 266 and 268 may be different, even in a single grate 260. For example, the walls may have lesser or greater depth at the center of the grate 260 compared to the peripheries thereof.

The grill or screen 260 is thus not only for keeping fingers out of the fan blades, to prevent injury to persons and also protect the blades from outside intrusion of foreign objects. It firstly keeps user's safe but unlike a wire screen that lets the air jet dispose in a bell like pattern which loses thrust, this design may focus the air flow into a column which may give more thrust using less battery which allows a lighter overall design. As mentioned, this can be very important since the thruster unit of the invention is often mounted on the end of the litter basket.

In accordance with the invention, there is therefore provided a patient litter basket assembly comprising a litter basket, means for connecting the litter basket to a helicopter or drone such that it can be raised or lowered relative to the helicopter or drone, at least one thruster unit positioned on or adjacent the patient litter basket assembly to selectively provide thrust to counter spin, and sensors position with respect to the patient litter basket for feeding information to the thruster units on a real-time basis so that the thrust developed by such thruster units can be immediately modulated according to the exterior conditions.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, a plurality means two or more. As used herein, a set of items may include one or more of such items. As used herein, whether in the written description or the claims, the terms comprising, including, carrying, having, containing, involving, and the like are to be understood to be open-ended, i.e., to mean including but not limited to. Only the transitional phrases consisting of and consisting essentially of, respectively, are closed or semi-closed transitional phrases with respect to claims. Use of ordinal terms such as first, second, third, etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, and/or means that the listed items are alternatives, but the alternatives also include any combination of the listed items.

The invention claimed is:

1. A patient litter basket spin control assembly for use on a patient litter basket, the assembly comprising:
   a thruster unit for discharging an air stream and mounted on or near the patient litter basket;
   at least one sensor associated with the thruster unit for sensing rotational movement or spin of the patient litter basket;
   a power source for powering the thruster unit and the sensor;
   a clamp member for mounting on the patient litter basket and for releasably receiving the thruster unit;
   wherein the sensor modulates the force of the air stream from the thruster unit so that the air stream counters the rotational movement of the patient litter basket to stabilize the patient litter basket by preventing the spin.

2. A patient litter basket spin control assembly as claimed in claim 1 wherein the sensors comprise a plurality of gyroscopes.

3. A patient litter basket spin control assembly as claimed in claim 1 wherein two thruster units are provided, each discharging the air stream in a substantially opposite direction from each other.

4. A patient litter basket spin control assembly as claimed in claim 1 wherein the thruster unit comprises a housing of generally tubular shape having a central portion and opposing end portions, a pair of fans mounted in the housing each near an opposing end portion and each for discharging the air stream in a substantially opposite direction from each other, the housing comprising a series of inlets at about the central portion thereof, wherein air intake for the fan is through the opposing end portion and the series of inlets.

5. A patient litter basket spin control assembly as claimed in claim 1 wherein the clamp member comprises a first connector portion for connecting to the patient litter basket and a second connecting portion for connecting to the thruster unit, the first connecting portion comprising a pair of arms pivotable with respect to each other between an open and locked position and defining a space for receiving the patient litter basket, and the second connecting portion comprises a receiving slot and guide rails for releasably receiving and holding the thruster unit on the patient litter basket.

6. A patient litter basket spin control assembly as claimed in claim 4 further comprising a grate protector for mounting over each of the opposing end portions.

7. A patient litter basket spin control assembly as claimed in claim 6 wherein the grate protector comprises a outer perimeter portion defining a central space and a plurality of slats extending through the central space, the slats having a depth or length in the direction of the air stream and facilitating the focusing of the air stream emerging from the thruster unit as it passes over the slats, to increase efficiency of the air stream.

8. A patient litter basket spin control assembly as claimed in claim 1 wherein the thruster unit comprises a housing, the housing having a compartment for accommodating the sensors, electronics and interchangeable batteries.

9. A patient litter basket assembly comprising:
a litter basket,
means for connecting the litter basket to a helicopter or drone such that it can be raised or lowered relative to the helicopter or drone,
at least one thruster unit positioned on or adjacent the patient litter basket assembly to selectively provide thrust to counter spin, and
sensors positioned with respect to the patient litter basket for feeding information to the thruster units on a real-time basis so that the thrust developed by such thruster units can be immediately modulated according to the exterior conditions to prevent or reduce spin of the patient litter basket.

* * * * *